US008817048B2

(12) United States Patent
Kerr et al.

(10) Patent No.: US 8,817,048 B2
(45) Date of Patent: Aug. 26, 2014

(54) SELECTIVE ROTATION OF A USER INTERFACE

(75) Inventors: Duncan Kerr, San Francisco, CA (US); Nicholas King, San Jose, CA (US)

(73) Assignee: Apple Inc., Cupertino, CA (US)

( * ) Notice: Subject to any disclaimer, the term of this patent is extended or adjusted under 35 U.S.C. 154(b) by 621 days.

(21) Appl. No.: 12/505,036

(22) Filed: Jul. 17, 2009

(65) Prior Publication Data

US 2011/0012926 A1 Jan. 20, 2011

(51) Int. Cl.
*G09G 5/00* (2006.01)

(52) U.S. Cl.
USPC ........................................ 345/649; 345/650

(58) Field of Classification Search
USPC ......................................... 345/649, 659, 650
See application file for complete search history.

(56) References Cited

U.S. PATENT DOCUMENTS

| | | | |
|---|---|---|---|
| 5,250,929 A * | 10/1993 | Hoffman et al. | 715/823 |
| 5,661,632 A * | 8/1997 | Register | 361/679.3 |
| 5,790,820 A * | 8/1998 | Vayda et al. | 715/834 |
| 5,936,619 A * | 8/1999 | Nagasaki et al. | 345/205 |
| 6,037,937 A * | 3/2000 | Beaton et al. | 715/764 |
| 6,115,025 A * | 9/2000 | Buxton et al. | 345/659 |
| 6,154,214 A * | 11/2000 | Uyehara et al. | 715/863 |
| 6,297,795 B1 * | 10/2001 | Kato et al. | 345/684 |
| 6,448,987 B1 * | 9/2002 | Easty et al. | 715/834 |
| 6,549,219 B2 * | 4/2003 | Selker | 715/834 |
| 6,597,384 B1 * | 7/2003 | Harrison | 345/204 |
| 6,686,909 B1 | 2/2004 | Endo | |
| 6,918,091 B2 * | 7/2005 | Leavitt et al. | 715/765 |
| 7,181,251 B2 * | 2/2007 | Stohr et al. | 455/566 |
| 7,469,381 B2 | 12/2008 | Ording | |
| 7,705,838 B2 * | 4/2010 | Kinerk et al. | 345/184 |
| 7,814,419 B2 * | 10/2010 | Fabritius | 715/702 |
| 7,978,182 B2 | 7/2011 | Ording et al. | |
| 8,194,033 B2 * | 6/2012 | Miyazawa | 345/156 |
| 8,245,143 B2 * | 8/2012 | Yach et al. | 715/744 |
| 8,325,206 B2 * | 12/2012 | Chen et al. | 345/650 |
| 8,468,466 B2 * | 6/2013 | Cragun et al. | 715/834 |
| 2002/0033836 A1 * | 3/2002 | Smith | 345/649 |
| 2003/0044000 A1 * | 3/2003 | Kfoury et al. | 379/433.04 |
| 2003/0103091 A1 * | 6/2003 | Wong et al. | 345/863 |
| 2003/0184525 A1 * | 10/2003 | Tsai | 345/173 |
| 2004/0021702 A1 * | 2/2004 | Lucaci et al. | 345/864 |

(Continued)

FOREIGN PATENT DOCUMENTS

WO 2007103631 A2 9/2007

OTHER PUBLICATIONS

J. Topolsky "Live from Amazon's Kindle event in NYC" May 6, 2009, XP002599927, pp. 1-17.

(Continued)

*Primary Examiner* — M Good Johnson
(74) *Attorney, Agent, or Firm* — Van Court & Aldridge LLP

(57) ABSTRACT

This is directed to rotating an entire user interface of a portable electronic device. In particular, this is directed to defining a UI orientation mode in which a user can direct the device to rotate a UI. When the UI orientation mode is enabled, the electronic device can detect particular inputs, for example based on the outputs of motion sensing components such as an accelerometer and a magnetometer, to determine how to rotate the UI. Once the UI has been rotated to a desired orientation, a user can lock the UI orientation and exit the UI orientation mode.

25 Claims, 3 Drawing Sheets

(56) References Cited

U.S. PATENT DOCUMENTS

| | | |
|---|---|---|
| 2004/0036680 A1* | 2/2004 | Davis et al. .................. 345/169 |
| 2005/0114788 A1 | 5/2005 | Fabritius |
| 2006/0026521 A1 | 2/2006 | Hotelling et al. |
| 2006/0274046 A1 | 12/2006 | Hillis et al. |
| 2007/0157095 A1 | 7/2007 | Bilow et al. |
| 2007/0220444 A1 | 9/2007 | Sunday et al. |
| 2008/0096726 A1* | 4/2008 | Riley et al. ....................... 482/8 |
| 2008/0165152 A1 | 7/2008 | Forstall et al. |
| 2008/0168403 A1 | 7/2008 | Westerman et al. |
| 2008/0303681 A1 | 12/2008 | Herz et al. |
| 2008/0309632 A1 | 12/2008 | Westerman et al. |
| 2009/0051648 A1 | 2/2009 | Shamaie et al. |
| 2009/0179854 A1 | 7/2009 | Weber et al. |
| 2009/0265670 A1* | 10/2009 | Kim et al. .................... 715/863 |
| 2009/0327963 A1* | 12/2009 | Mouilleseaux et al. ...... 715/834 |
| 2010/0188371 A1* | 7/2010 | Lowles et al. ................ 345/178 |

OTHER PUBLICATIONS

Anonymous "Amazon Kindle" Wikipedia, Sep. 9, 2010, XP002599928, pp. 1-15.

* cited by examiner

SELECTIVE ROTATION OF A USER INTERFACE

BACKGROUND OF THE INVENTION

An electronic device can include a display for providing information to a user. The display typically can include a specific orientation in which information can be displayed. For example, in laptop computers or computer displays, the display orientation is usually fixed relative to the device, and the user interface ("UI") typically remains fixed and matches the display orientation. With some mobile devices, however, a user can rotate the device such that the orientation of the display relative to the user changes. For example, using a device such as the iPhone or iPod Touch available from Apple Inc. of Cupertino, Calif., displayed images or other content can be rotated in the display based on the output of an accelerometer.

In some cases, however, a user may wish to change the orientation of a user interface independent of the orientation of the device relative to the earth (e.g., as determined by the accelerometer), or relative to a clip of the device used to attach the device to the user's apparel. For example, an electronic device can be attached to a user's arm, such that the device is upside down relative to the earth when the user looks down at the device on his arm. If the user interface orientation is determined relative to the earth, the displayed interface can be upside for the user. This can limit the user's ability to view information displayed by the device and interact with the user interface.

SUMMARY OF THE INVENTION

This is directed to systems, methods and computer-readable media for changing the orientation of a user interface in response to a specific user input. In particular, this is directed to enabling a specific mode during which the orientation of an electronic device can be changed.

In some embodiments, an electronic device can include a display on which different types of information can be displayed. For example, an electronic device can display content, a user interface (e.g., selectable buttons or options), or any other information. The displayed information can be orientation specific, such that the information is best viewed from a particular perspective. For example, the displayed information can include text, which may be best read when oriented properly relative to the user (e.g., not upside down). As another example, the displayed information can include selectable displayed options that have a particular orientation.

To change the orientation of the entire UI, the electronic device can provide a UI orientation mode in which particular inputs or events detected by the device can be used to change the orientation of the entire UI. Any suitable input can serve to enable the UI orientation mode, including for example inputs detected by an input interface (e.g., touch inputs or button presses), detected environment events (e.g., specific events detected by the ambient light sensor), accessory inputs (e.g., connecting or removing an accessory), or any other suitable input. Once in the UI orientation mode, the electronic device can monitor for inputs directing the device to change the orientation of the UI. For example, the electronic device can monitor an input interface for a particular input associated with changing the UI orientation. As another example, the electronic device can detect accelerometer outputs depicting the orientation of the device relative to the earth's surface. As still another example, the electronic device can receive an instruction from an accessory device, or detect a change in state of an accessory.

Once the user has changed the orientation of the UI, the user can provide an instruction to lock the orientation of the UI and exit the UI orientation mode. For example, the user can provide an input using a different mechanism or approach than that used to change the UI orientation (e.g., use accelerometer output to change the UI orientation, and use a touch input to lock the UI).

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to changing the orientation of a user interface and other displayed information on a display. In particular, this is directed to a device having a UI orientation mode in which a user can select and set the orientation of a UI relative to an electronic device display.

In the following description of preferred embodiments, reference is made to the accompanying drawings which form a part hereof, and in which it is shown by way of illustration specific embodiments in which the invention can be practiced. It is to be understood that other embodiments can be utilized and structural changes can be made without departing from the scope of the preferred embodiments of the present invention.

Figure 1:
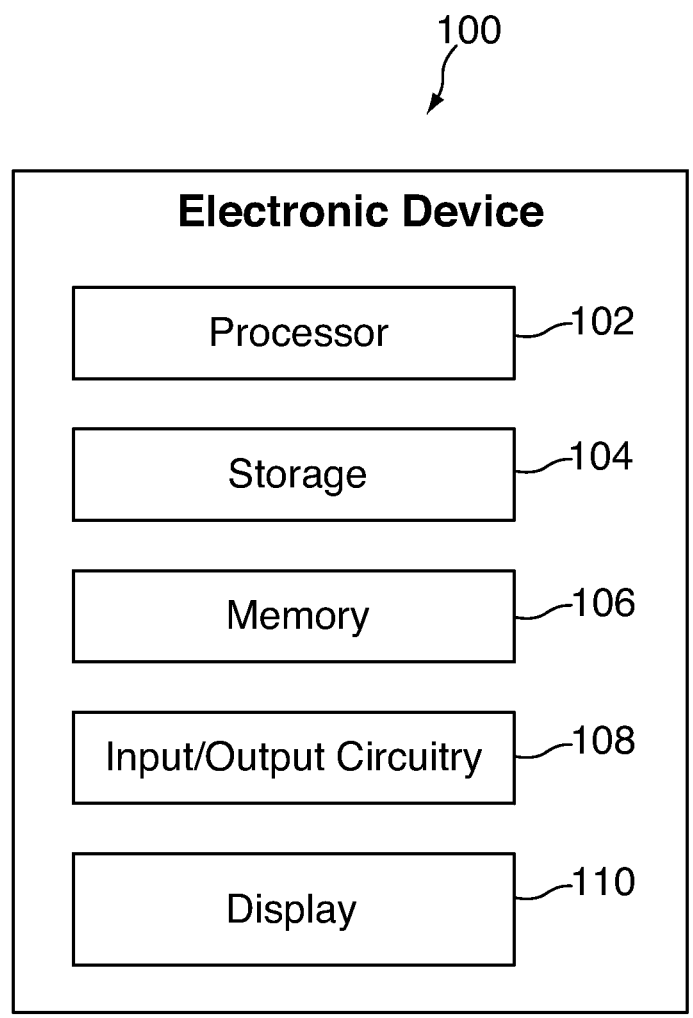
FIG. 1 is a schematic view of an illustrative electronic device having a re-orientable UI in accordance with one embodiment of the invention.

FIG. 1 is a schematic view of an illustrative electronic device having a re-orientable UI in accordance with one embodiment of the invention. Electronic device 100 can include any suitable type of electronic device operative to display information to a user. For example, electronic device 100 can include a media player such as an iPod® available by Apple Inc., of Cupertino, Calif., a cellular telephone, a personal e-mail or messaging device (e.g., a Blackberry® or a Sidekick®), an iPhone® available from Apple Inc., pocket-sized personal computers, personal digital assistants (PDAs), a laptop computer, a tablet, a music recorder, a video recorder, a gaming device, a camera, radios, medical equipment, and any other portable electronic device having a display from which a user can select a portion of displayed objects.

Electronic device 100 can include a processor or control circuitry 102, storage 104, memory 106, input/output circuitry 108, display 110, and the like as typically found in an electronic device of the type of electronic device 100, and can be operative to enable any of the uses expected from an electronic device of the type of electronic device 100 (e.g., connect to a host device for power or data transfers). In some embodiments, one or more components of electronic device 100 can be combined or omitted (e.g., combine storage 104 and memory 106), electronic device 100 can include other components not combined or included in those shown in FIG. 1 (e.g., communications circuitry or positioning circuitry), or electronic device 100 can include several instances of the components shown in FIG. 1. For the sake of simplicity, only one of each of the components is shown in FIG. 1.

Control circuitry 102 can include any processing circuitry or processor operative to control the operations and performance of electronic device 100. Using instructions retrieved, for example from memory, control circuitry 102 can control the reception and manipulation of input and output data between components of electronic device 100. Control circuitry 102 can be implemented on a single-chip, multiple chips or multiple electrical components. For example, various architectures can be used for control circuitry 102, including dedicated or embedded processor, single purpose processor, controller, ASIC, and so forth.

Storage 104 can include, for example, one or more storage mediums including a hard-drive, solid state drive, flash memory, permanent memory such as ROM, any other suitable type of storage component, or any combination thereof. In some embodiments, storage 104 can include a removable storage medium and loaded or installed onto electronic device 100 when needed. Removable storage mediums include, for example, CD-ROM, PC-CARD, memory card, floppy disk, magnetic tape, and a network component. Memory 106 can include cache memory, semi-permanent memory such as RAM, and/or one or more different types of memory used for temporarily storing data. In some embodiments, memory 106 and storage 104 can be combined as a single storage medium.

Input/output ("I/O") circuitry 108 can be operative to convert (and encode/decode, if necessary) analog signals and other signals into digital data. Input/output circuitry 108 can be coupled to or include any suitable input interface, such as for example, a button, keypad, dial, a click wheel, tap sensor (e.g., via an accelerometer), or a touch screen (e.g., using single or multipoint capacitive sensing, resistive sensing, surface acoustic wave sensing, pressure sensing, optical sensing, and the like), as well as any suitable output circuitry associated with output devices (e.g., audio outputs or display circuitry or components). In some embodiments, I/O circuitry 108 can be used to perform tracking and to make selections with respect to a UI on display 110, issue commands in device 100, or any other operation relating to detecting inputs or events from outside of the device and providing information describing the inputs or events to the device circuitry. In some embodiments, input/output circuitry 108 can interface with one or more sensors of the device, such as an accelerometer, ambient light sensor, magnetometer, magnetometer, IR receiver, microphone, thermostat, barometer, or other sensor that can enable the UI orientation mode in response to detecting an environmental condition. In some embodiments, I/O circuitry 108 can include ports or other communications interfaces for interfacing with external devices or accessories (e.g., keyboards, printers, scanners, cameras, microphones, speakers, and the like).

Display 110 can be operatively coupled to control circuitry 102 for providing visual outputs to a user. Display 110 can include any suitable type of display, including for example a liquid crystal display (LCD) (e.g., active matrix, passive matrix and the like), a monochrome display, color graphics adapter (CGA) display, enhanced graphics adapter (EGA) display, variable-graphics-array (VGA) display, super VGA display, cathode ray tube (CRT), a plasma display, a display implemented with electronic inks, or any other suitable display. Display 110 can be configured to display a graphical user interface that can provide an easy to use interface between a user of the computer system and the operating system or application running thereon. The UI can represent programs, files and operational options with graphical images, objects, or vector representations, and can include windows, fields, dialog boxes, menus, icons, buttons, cursors, scroll bars, etc. Such images can be arranged in predefined layouts, or can be created dynamically to serve the specific actions being taken by a user. During operation, the user can select and/or activate various graphical images in order to initiate functions and tasks associated therewith.

In some embodiments, electronic device 100 can include a bus operative to provide a data transfer path for transferring data to, from, or between control processor 102, storage 104, memory 106, input/output circuitry 108, display 110 and any other component included in the electronic device.

Figure 2:
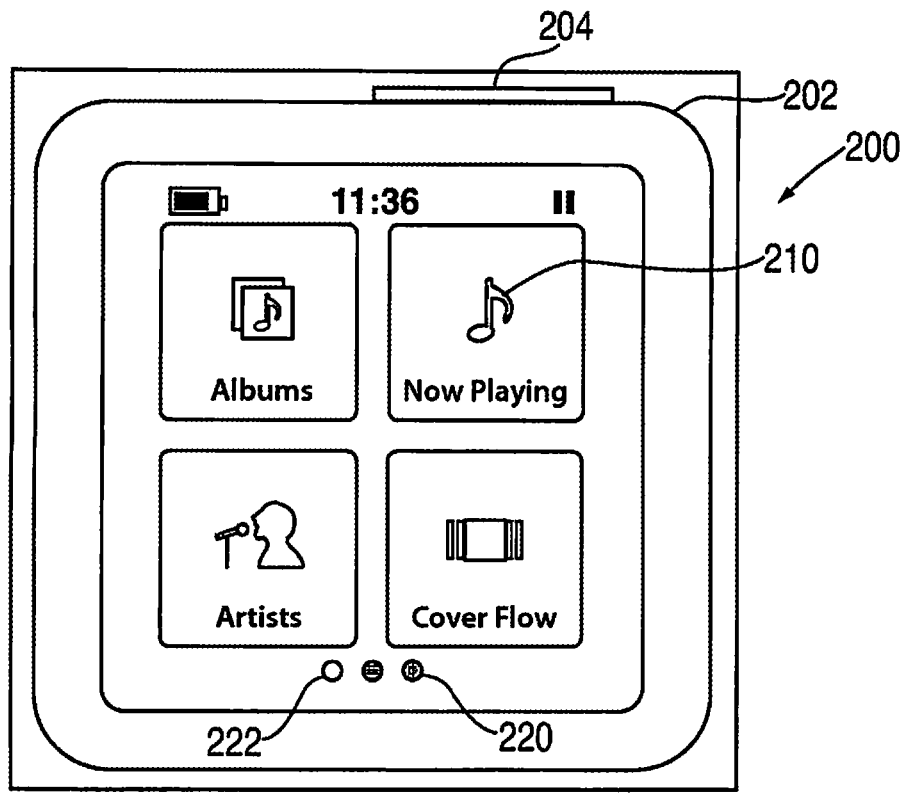
FIG. 2 is a schematic view of an illustrative user interface for interacting with an electronic device in accordance with one embodiment of the invention.

Using the electronic device, a user can display any suitable information on the device display. For example, the electronic device can display images, objects, documents, or any other suitable information. FIG. 2 is a schematic view an illustrative user interface for interacting with an electronic device in accordance with one embodiment of the invention. Display 200 can include options 210 displayed on one of several available screens. The displayed options 210 can identify operations that the user can direct the device to perform using any suitable approach, including for example via one or more of icons or images, text, buttons, or other display features. Display 200 can include several pages of options 210. In one implementation, display 200 can identify several available pages using markers 220, and identify the currently displayed page by differentiating one of the markers 220 (e.g., marker 222 is highlighted). Display 200 can have any suitable orientation relative to device 202. In the example of FIG. 2, display 200 is aligned with device 202 (e.g., such that the top of display 200 is adjacent to button 204 of electronic device 202)

The electronic device display can have any suitable shape, including for example a shape that has a varying aspect ratio based on the orientation of the display (e.g., a rectangular shape) or a shape with a uniform aspect ratio (e.g., a square shape, as shown in FIG. 2). Because of the change in aspect ratio or general shape of the display based on the device orientation, different UIs can be displayed based on the device orientation. In particular, buttons or other displayed options can have different sizes, positions, and content in the different UIs. In addition, a user may wish to view a UI in different orientations based on the manner in which the device is held. For example, a user may wish that a UI is upside down relative to the user when the user is showing something to a friend across a table, or when the device is attached to the user's arm (e.g., so that the user can lift his arm and see the UI in the proper orientation).

Different approaches can be used to change the orientation of a displayed UI. In some devices, an accelerometer can be used to monitor the device movement and determine the orientation of the device relative to the gravity vector. This approach can be useful, for example with devices having rectangular displays for which the UI changes based on the display orientation. This approach, however, may not be desirable when a user wishes to view a UI in a particular orientation independent of the device orientation relative to gravity. For example, a user lying on his side may wish that the UI remains at a 90 degree angle relative to the gravity vector. As another example, a user with an electronic device attached to his arm may wish that the UI be upside down relative to the gravity vector so that the user can properly see the UI when the user looks down on his arm.

To allow a user to control the orientation of the UI, the electronic device can include a UI orientation mode that must be enabled for changing the orientation of the UI. The user can enable the UI orientation mode using any suitable approach, including by providing an input using an input interface. For example, a user can select a menu option for enabling the UI orientation mode. As another example, the user can provide a particular input associated with enabling the UI orientation mode using an input interface, such as providing a circular touch gesture on a touch screen or a two finger tap on a touch screen. In some embodiments, the electronic device can enable the UI orientation mode in response to detecting attributes of the environment (e.g., environment events) using sensors embedded in or coupled to the device. For example, an accelerometer, ambient light sensor, GPS, magnetometer, IR receiver, microphone, or other sensor can enable the UI orientation mode in response to detecting an environmental condition associated with the mode. For example, the UI orientation mode can be associated with a particular shake or movement of the device (e.g., detected by the accelerometer), pattern of light and darkness (e.g., a user moving a hand over the ALS in a known pattern), rotation of the device (e.g., rotating the device in a pattern by a particular amount detected by the magnetometer), or any other environmental condition that can be detected by a device sensor.

In some embodiments, a user can provide an input for enabling the UI orientation mode using a mechanical component of the electronic device housing. For example, the electronic device can have a clip for attaching the electronic device to the user's clothes. The clip can include a magnetic portion operative to trip a magnetic switch when the clip is opened or closed. To enable the UI orientation mode, a user can open or close the clip in a particular pattern so that the magnetic switch within the device can detect a pattern associated with the mode. In some embodiments, the switch can instead or in addition include one or more of a mechanical switch and an electrical switch that are actuated by the movement of the clip.

Once the UI orientation mode enabled, the user can provide any suitable input to change the orientation of the display relative to the device. In some embodiments, the change in orientation of the UI can be defined using any suitable input, including for example any of the inputs discussed above in connection with enabling the UI orientation mode. In one implementation, an accelerometer or magnetometer output can be used to determine the amount by which to rotate the UI. For example, the electronic device can rotate the UI by an angle determined from the change in orientation of the device relative to the magnetic north or magnetic south. As another example, the electronic device can rotate the UI by an angle determined from the orientation of the device relative to the gravity vector.

Figure 3:
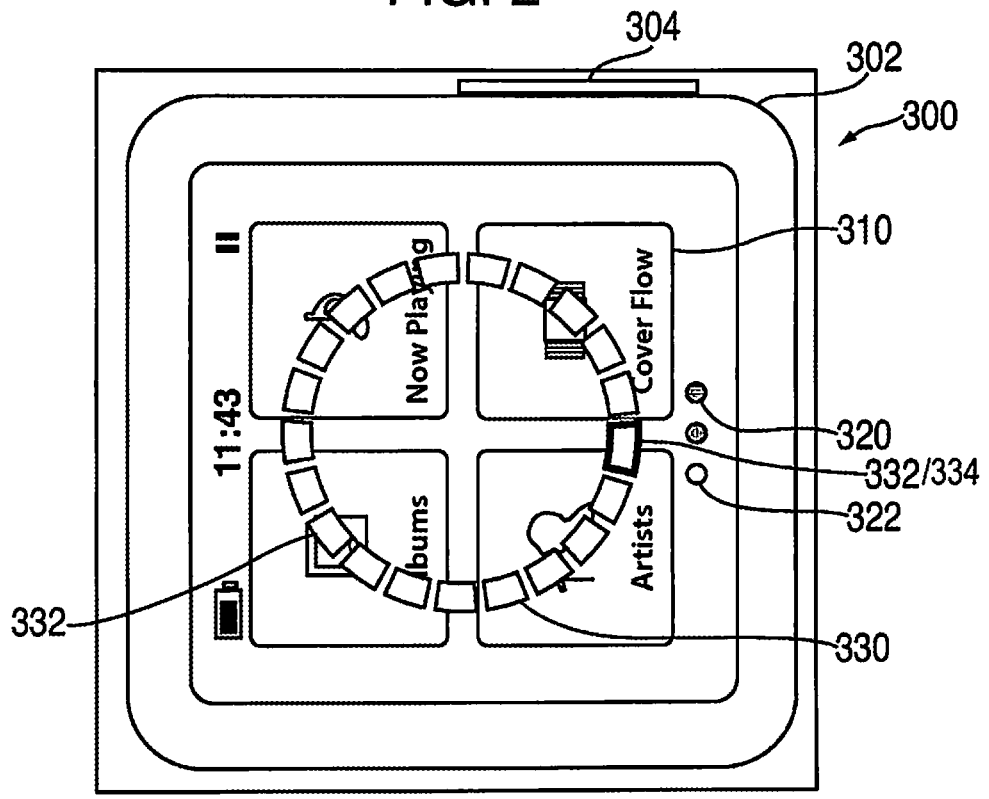
FIG. 3 is a schematic view of an illustrative rotated user interface in accordance with one embodiment of the invention.

The electronic device can change the orientation of the displayed UI by any suitable amount. In some embodiments, the electronic device can provide a limited number of UI orientations at predetermined angles (e.g., four UI orientations at 90degree intervals). In some cases, the available UI orientations can be selected based on the dimensions and shape of the display (e.g., provide UIs oriented with a straight side or edge of the display). Alternatively, the electronic device can provide a UI at any suitable angle selected by a user, including for example arbitrary angles that do not match up with the display shape. FIG. 3 is a schematic view of an illustrative rotated user interface in accordance with one embodiment of the invention. Display 300 can include options 310 and markers 320, which can include some or all of the features of options 210 and markers 220 of display 200 (FIG. 2). In some embodiments, display 300 can include substantially the same UI elements as display 200. Display 300 can be rotated relative to device 302 (as shown by the orientation of the UI relative to button 304), such that the UI is at an angle relative to the up/down orientation of the device. The electronic device can indicate that the UI orientation mode is enabled using any suitable approach, including for example using circular overlay 330. If the electronic device has a limited number of UI orientations available, overlay 330 can include individual segments 332 defining the available orientations. The electronic device can highlight the particular segment 332 (e.g., segment 334) that indicates the current orientation of the UI.

Once the user has changed the orientation of the UI to a desired orientation, the user can lock the UI and exit the UI orientation mode using any suitable approach. In some embodiments, the electronic device can provide an input using any suitable approach, including any of the approaches discussed above in connection with enabling the UI orientation mode. For example, the electronic device can lock a UI in a particular orientation and exit the UI orientation mode in response to detecting a user input on a touch screen (e.g., tap the screen to lock the UI). The electronic device can then revert to a non-UI orientation mode (e.g., a media playback mode, communications mode, standby mode, or other standard mode).

Figure 4:
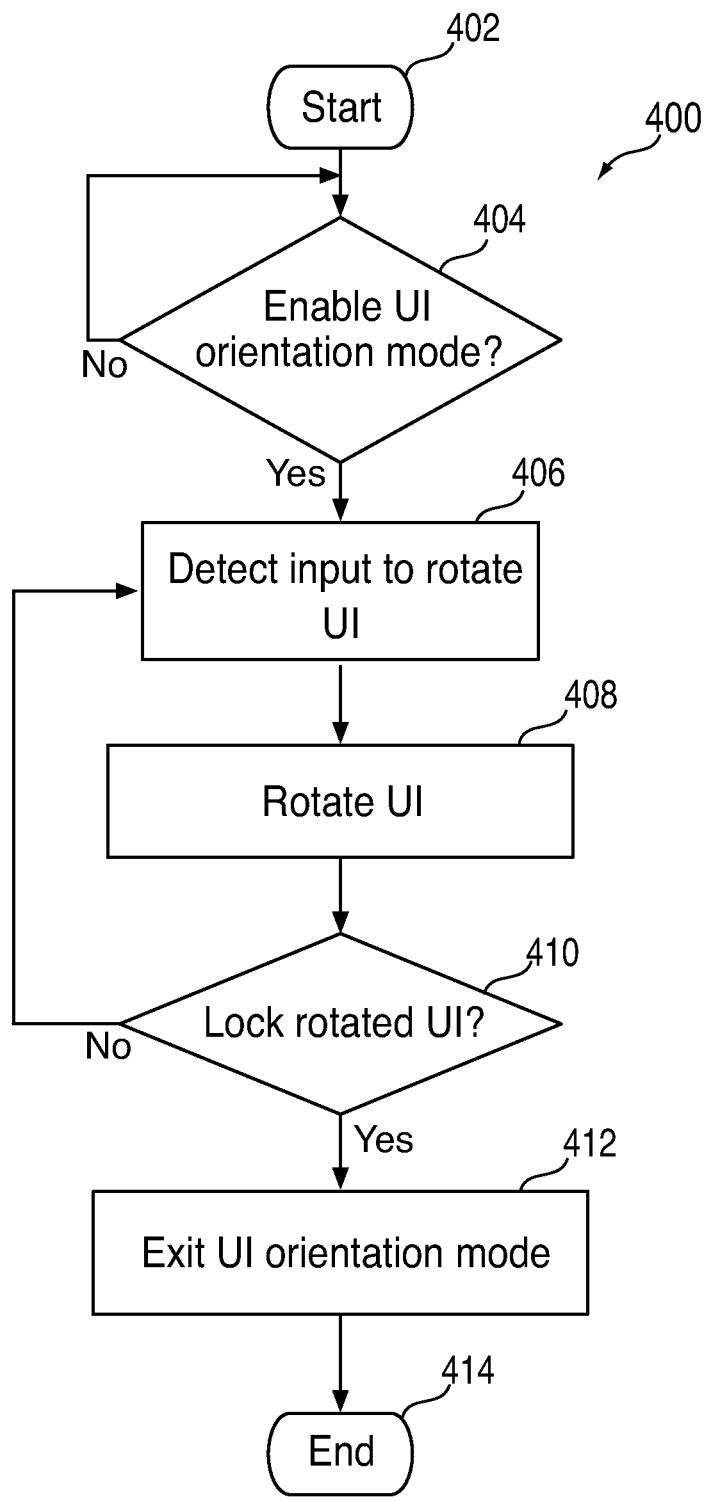
FIG. 4 is a flowchart of an illustrative process for changing the orientation of a displayed UI in accordance with one embodiment of the invention.

The following flowchart describes processes used by the electronic device to change the orientation of information displayed by a device using a UI orientation mode. FIG. 4 is a flowchart of an illustrative process for changing the orientation of a displayed UI in accordance with one embodiment of the invention. Process 400 can begin at step 402. At step 404, the electronic device can determine whether to enable a UI orientation mode. For example, the electronic device can determine whether an input associated with enabling the UI orientation mode was provided (e.g., a touch input associated with the UI orientation mode). If the electronic device determines that the UI orientation mode should not be enabled, process 400 can return to step 404 and continue to monitor for inputs enabling the UI orientation mode.

If, at step 404, the electronic device instead determines that the UI orientation mode should be enabled, process 400 can move to step 406. At step 406, the electronic device can detect an input to rotate the UI. For example, the electronic device can detect a sensor output associated with rotating the UI (e.g., an accelerometer or a magnetometer). At step 408, the electronic device can change the orientation of the UI based on the detected input. For example, the electronic device can extract an angle measurement from the detected input, and change the orientation of the UI by the extracted angle measurement. In some embodiments, the electronic device can snap the UI orientation to predetermined orientations (e.g., 90 degree intervals). At step 410, the electronic device can determine whether an instruction to lock the UI was received. For example, the electronic device can determine whether a user provided an input (e.g., a touch input) to lock the UI orientation. If the electronic device determines that no instruction was received, process 400 can return to step 406 and continue to detect inputs for rotating the UI.

If, at step 410, the electronic device instead determines that an instruction to lock the UI was received, process 400 can move to step 412. At step 412, the electronic device can lock the UI orientation and exit the UI orientation mode. For example, the electronic device can return to the mode enabled prior to the UI orientation mode. As another example, the electronic device can return to a default mode (e.g., media playback mode). Process 400 can then end at step 414.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above described embodiments of the invention are presented for purposes of illustration and not of limitation, and the present invention is limited only by the claims which follow.

What is claimed is:

1. A method for changing the orientation of a displayed user interface on an electronic device, comprising:
    enabling a user interface orientation mode of the electronic device by at least one of opening and closing a clip of the electronic device in a particular pattern, wherein the clip comprises a switch;
    while the user interface orientation mode is enabled, detecting an input associated with changing the orientation of the displayed user interface on the electronic device, wherein the input is independent from the clip;
    while the user interface orientation mode is enabled, changing the orientation of the displayed user interface on the electronic device in response to the detected input; and
    exiting the user interface orientation mode to lock the changed orientation of the displayed user interface on the electronic device by at least one of opening and closing the clip of the electronic device.

2. The method of claim 1, further comprising:
    receiving an input from an input interface, wherein the input received from the input interface is of a different type than the detected input associated with changing the orientation of the displayed user interface.

3. The method of claim 1, wherein:
    detecting the input comprises detecting an output of at least one of an accelerometer and a magnetometer; and
    changing comprises changing the orientation of the displayed user interface in response to the detected output.

4. The method of claim 3, further comprising:
    defining an angle from the detected output of the at least one of an accelerometer and a magnetometer; and
    changing the orientation of the displayed user interface by the defined angle.

5. The method of claim 1, further comprising:
    defining a plurality of available user interface orientations; and
    changing the orientation of the displayed user interface to one of the defined plurality of available user interface orientations.

6. The method of claim 5, wherein:
    the plurality of available user interface orientations are offset by 90 degree angles.

7. The method of claim 5, wherein:
    the electronic device comprises four available user interface orientations.

8. The method of claim 1, wherein the clip attaches the electronic device to a user's clothing.

9. The method of claim 1, wherein:
    the switch comprises at least one of a magnetic switch, a mechanical switch, and an electrical switch; and
    the switch is actuated by the particular pattern.

10. An electronic device comprising a display, an input interface, a sensing component and control circuitry, the control circuitry operative to:
    direct the display to display a user interface;
    direct the input interface to receive an input enabling a user interface orientation mode, wherein the input interface is a clip that comprises a switch, when the clip is at least one of opened and closed in a particular pattern associated with the user interface orientation mode;
    while the user interface orientation mode is enabled, receive a sensor output from the sensing component; and
    while the user interface orientation mode is enabled, direct the display to change the orientation of the user interface based on the received sensor output, wherein the sensing component comprises one of a motion sensing component and a touch screen component.

11. The electronic device of claim 10, wherein the control circuitry is further operative to:
    define a plurality of available orientations for the user interface.

12. The electronic device of claim 11, wherein:
    the display comprises a plurality of straight edges; and
    at least one of the plurality of available user interface orientations of the user interface is associated with one of the plurality of straight edges.

13. The electronic device of claim 10, wherein the control circuitry is further operative to:
    define an angle from the sensor output.

14. The electronic device of claim 13, wherein the control circuitry is further operative to:
    determine a change in orientation of the electronic device from the time the user interface orientation mode is enabled via the received sensor output; and
    define an angle related to the change in orientation of the electronic device.

15. The electronic device of claim 14, wherein the control circuitry is further operative to:
    determine the change in orientation of the electronic device relative to at least one of a magnetic north pole and a magnetic south pole.

16. The electronic device of claim 14, wherein the control circuitry is further operative to:
    determine the change in orientation of the electronic device relative to a gravity vector.

17. The electronic device of claim 10, wherein the control circuitry is further operative to:
    direct the input interface to receive an input locking the orientation of the user interface; and
    disable the user interface orientation mode in response to receiving the input locking the orientation of the user interface.

18. The electronic device of claim 17, wherein the control circuitry is further operative to direct the input interface to receive the input locking the orientation of the user interface when the clip is at least one of opened and closed in another particular pattern associated with the user interface orientation mode.

19. The electronic device of claim 10, wherein:
the switch comprises at least one of a magnetic switch, a mechanical switch, and an electrical switch; and
the switch is actuated by the particular pattern.

20. Non-transitory computer-readable media for changing the orientation of a displayed user interface, comprising computer readable code recorded thereon for:
enabling a user interface orientation mode on an electronic device by detecting a particular condition of the electronic device, wherein the detecting the particular condition comprises one of:
detecting a particular movement of the electronic device with a motion sensor of the electronic device;
detecting a particular pattern of light and darkness with an ambient light sensor of the electronic device; and
detecting at least one of opening and closing of a clip of the electronic device in a particular pattern;
while the user interface orientation mode is enabled, detecting an input associated with changing the orientation of the displayed user interface with the electronic device;
while the user interface orientation mode is enabled, changing the orientation of the displayed user interface on a display of the electronic device in response to the detected input; and
exiting the user interface orientation mode to lock the changed orientation of the displayed user interface on the display of the electronic device.

21. The non-transitory computer-readable media of claim 20, wherein:
detecting the input comprises detecting an output of at least one of an accelerometer and a magnetometer with the electronic device; and
changing the orientation of the displayed user interface on the display of the electronic device comprises changing the orientation in response to the detected output.

22. The non-transitory computer-readable media of claim 20, wherein:
the detecting the particular condition comprises detecting at least one of opening and closing of a clip of the electronic device in a particular pattern; and
the exiting the user interface orientation mode to lock the changed orientation of the displayed user interface on the display of the electronic device comprises at least one of opening and closing the clip.

23. The non-transitory computer-readable media of claim 22, wherein:
the clip comprises a switch;
the switch comprises at least one of a magnetic switch, a mechanical switch, and an electrical switch; and
the switch is actuated by the particular pattern.

24. The non-transitory computer-readable media of claim 20, wherein the detecting the particular condition comprises detecting a particular movement of the electronic device with a motion sensor of the electronic device.

25. The non-transitory computer-readable media of claim 20, wherein the detecting the particular condition comprises detecting a particular pattern of light and darkness with an ambient light sensor of the electronic device.

* * * * *